United States Patent
Arzola et al.

(10) Patent No.: US 10,740,035 B1
(45) Date of Patent: Aug. 11, 2020

(54) SYSTEM AND METHOD FOR CONTROLLING MANAGEMENT COMMANDS AT DEVICES

(71) Applicant: Dell Products L.P., Round Rock, TX (US)

(72) Inventors: Christopher Domingo Arzola, Round Rock, TX (US); Austin Patrick Bolen, Austin, TX (US); Hahn Norden, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/404,305

(22) Filed: May 6, 2019

(51) Int. Cl.
*G06F 12/00* (2006.01)
*G06F 3/06* (2006.01)

(52) U.S. Cl.
CPC .......... *G06F 3/0659* (2013.01); *G06F 3/0604* (2013.01); *G06F 3/0683* (2013.01); *G06F 2003/0697* (2013.01)

(58) Field of Classification Search
CPC .............................. G06F 3/0659; G06F 3/0604
USPC .......................................................... 711/103
See application file for complete search history.

(56) References Cited

U.S. PATENT DOCUMENTS

| | | | | |
|---|---|---|---|---|
| 6,026,469 A * | 2/2000 | Hoang | ................ | G06F 12/0684 710/63 |
| 6,336,161 B1 * | 1/2002 | Watts | ........................ | G06F 1/30 711/103 |
| 2008/0005462 A1 * | 1/2008 | Pyeon | ..................... | G06F 3/061 711/113 |

* cited by examiner

*Primary Examiner* — Jae U Yu
(74) *Attorney, Agent, or Firm* — Baker Botts L.L.P.

(57) ABSTRACT

Methods, systems, and computer programs encoded on computer storage medium, for determining a unique identifier and a firmware version of each device; updating a cache storage to store the unique identifier and the firmware version for each device; generating, for a particular device, a command that is to be performed at the particular device; accessing the cache storage to identify the cached unique identifier and the cached firmware version for the particular device; transmitting, to a device driver or the particular device, the command and data indicating the cached unique identifier and the cached firmware version for the particular device; determining, by the device driver or the particular device, that i) the cached unique identifier matches a current unique identifier for the particular device and ii) the cached firmware version matches a current firmware version for the particular device; and completing the command at the particular device.

20 Claims, 3 Drawing Sheets

SYSTEM AND METHOD FOR CONTROLLING MANAGEMENT COMMANDS AT DEVICES

BACKGROUND

Field of the Disclosure

The disclosure relates generally to information handling systems, and specifically, controlling management commands at devices.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As the adoption of hot-swappable devices continues to increase in order to maximize up-time in datacenters, software must now factor in the possibility that devices could be inserted and removed at any point in time. A window of time exists where the originally inventoried device can be replaced with another like device. If a device has been replaced (hot-swapped) since the management software has inventoried the device, then the management operation intended for the old device could be inadvertently sent to the new device. This problem can be further exposed if the following situation is considered: i) a remote system administrator is erasing drives; ii) the administrator sees a particular drive model that's to be de-commissioned and starts the process to erase it; iii) at the same time, someone in the datacenter is already physically swapping out the old drives with the new replacements; and iv) the original drive that the administrator was trying to erase gets swapped for a new drive just before they're able to confirm the operation, resulting in the original drive not being erased and instead inadvertently erasing the new drive.

SUMMARY

Innovative aspects of the subject matter described in this specification may be embodied in a method for controlling management commands at devices, the method including identifying a plurality of devices for inventorying; determining, for each of the plurality of devices and by a management software module, i) a unique identifier for the device and ii) a firmware version of the device; updating a cache storage to store the unique identifier and the firmware version for each device of the plurality of devices; generating, for a particular device of the plurality of devices and by the management software module, a management command that is to be performed at the particular device; in response to generating the management command, accessing the cache storage to identify the cached unique identifier and the cached firmware version for the particular device; transmitting, by the management software module and to a device driver associated with the particular device or to the particular device, the management command and data indicating the cached unique identifier and the cached firmware version for the particular device; determining, by the device driver or the particular device, that i) the cached unique identifier matches a current unique identifier for the particular device and ii) the cached firmware version matches a current firmware version for the particular device; and in response to the matching, completing the management command at the particular device.

These and other embodiments may each optionally include one or more of the following features. For instance, determining, by the device driver or the particular device, that the cached unique identifier does not match the current unique identifier for the particular device; and in response to determining that the cached unique identifier does not match the current unique identifier for the particular device, rejecting the management command at the particular device. Determining, by the device driver or the particular device, that the cached firmware version does not match the current firmware version for the particular device; and in response to determining that the cached firmware version does not match the current firmware version for the particular device, rejecting the management command at the particular device. The unique identifier for each device is based on one or more properties of the device, the properties including, for each device, one or more of a serial number of the device, a state of the device, and a current configuration of the device. Applying, by the management software module, an algorithm based on the properties of the particular device to determine the unique identifier for the particular device. Determining, by the device driver, i) the current unique identifier for the particular device and ii) the current firmware version for the particular device. Applying, by the device driver, an algorithm based on the properties of the particular device to determine the current unique identifier for the particular device. The unique identifier is a universally unique identifier (UUID). The plurality of devices are storage devices.

Other embodiments of these aspects include corresponding system, apparatus, and computer programs, configured to perform the actions of the methods, encoded on computer storage devices.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
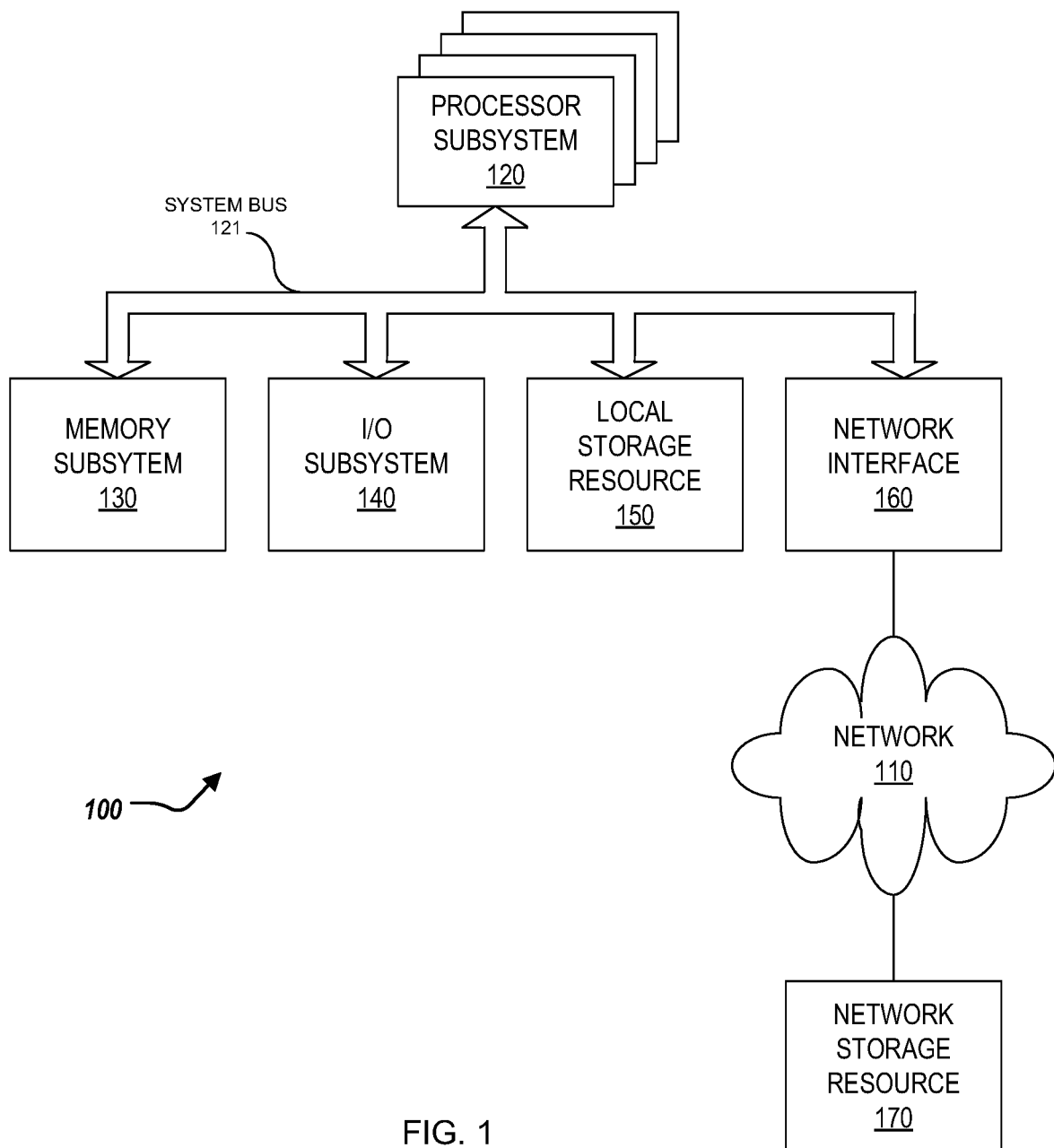
FIG. 1 is a block diagram of selected elements of an embodiment of an information handling system.

This document describes controlling management commands at devices. Specifically, data that is unique to a device (such as a unique identifier, and a firmware version) can be packaged with a management command at the time of management operation that is transmitted to a device driver. Once the management command is received by the device's driver, the device driver can determine if the packaged unique identifier matches that of the current device. In some examples, the unique identifier is derived from the properties of the device such that both a management application and the driver software can use the same algorithm to derive the same identifier per device. The current running firmware version can also be compared against the supplied version (since the possibility of settings changing across firmware builds can inadvertently result in improperly formed commands). Either a unique identifier or firmware mismatch can result in the management command being rejected by the device driver.

Specifically, this document describes identifying a plurality of devices for inventorying; determining, for each of a plurality of devices and by a management software module, i) a unique identifier for the device and ii) a firmware version of the device; updating a cache storage to store the unique identifier and the firmware version for each device of the plurality of devices; generating, for a particular device of the plurality of devices and by the management software module, a management command that is to be performed at the particular device; in response to generating the management command, accessing the cache storage to identify the cached unique identifier and the cached firmware version for the particular device; transmitting, by the management software module and to a device driver associated with the particular device, the management command and data indicating the cached unique identifier and the cached firmware version for the particular device; determining, by the device driver, that i) the cached unique identifier matches a current unique identifier for the particular device and ii) the cached firmware version matches a current firmware version for the particular device; and in response to the matching, completing the management command at the particular device.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2:
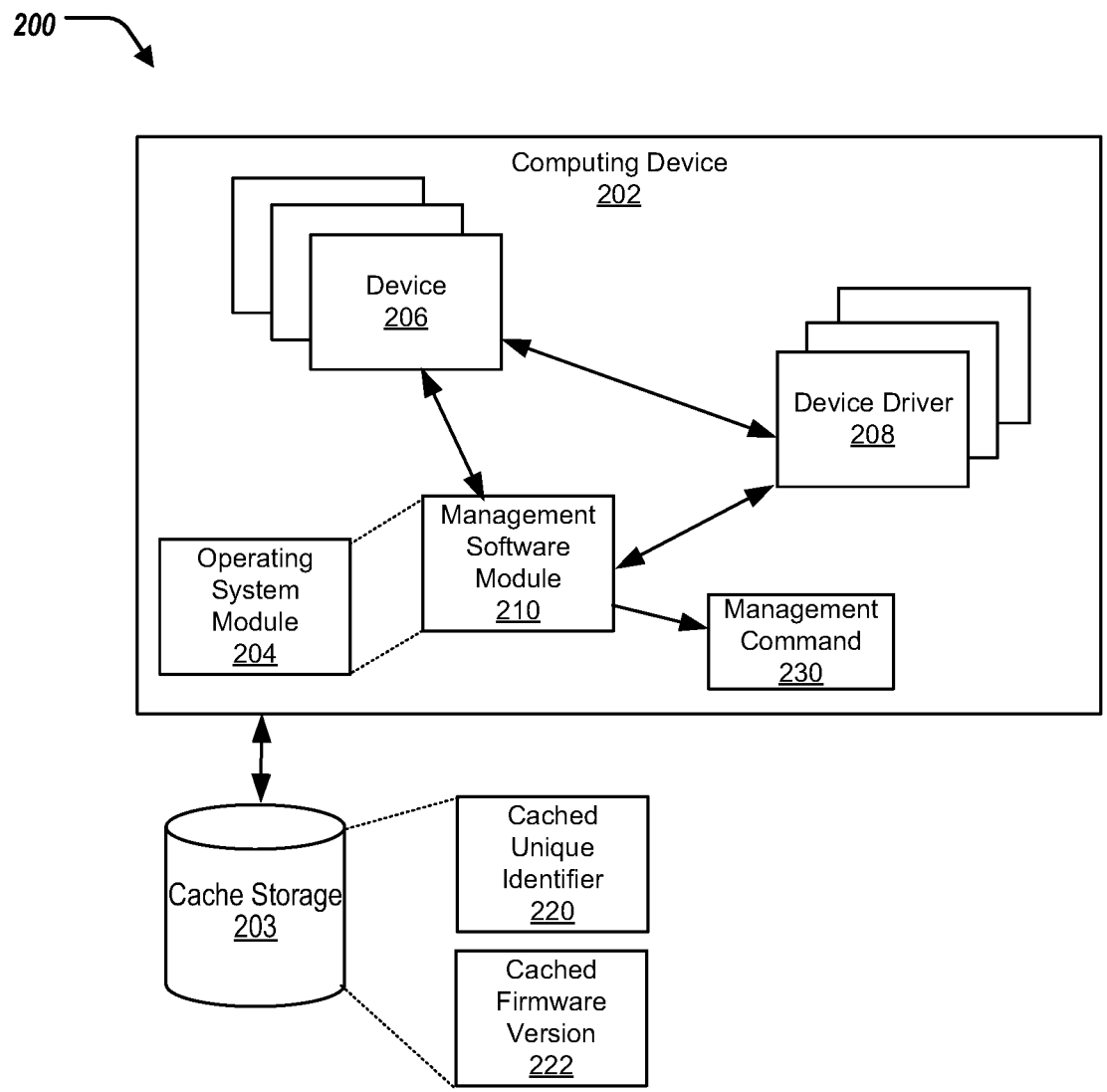
FIG. 2 illustrates a block diagram for controlling management commands at devices.
Figure 3:
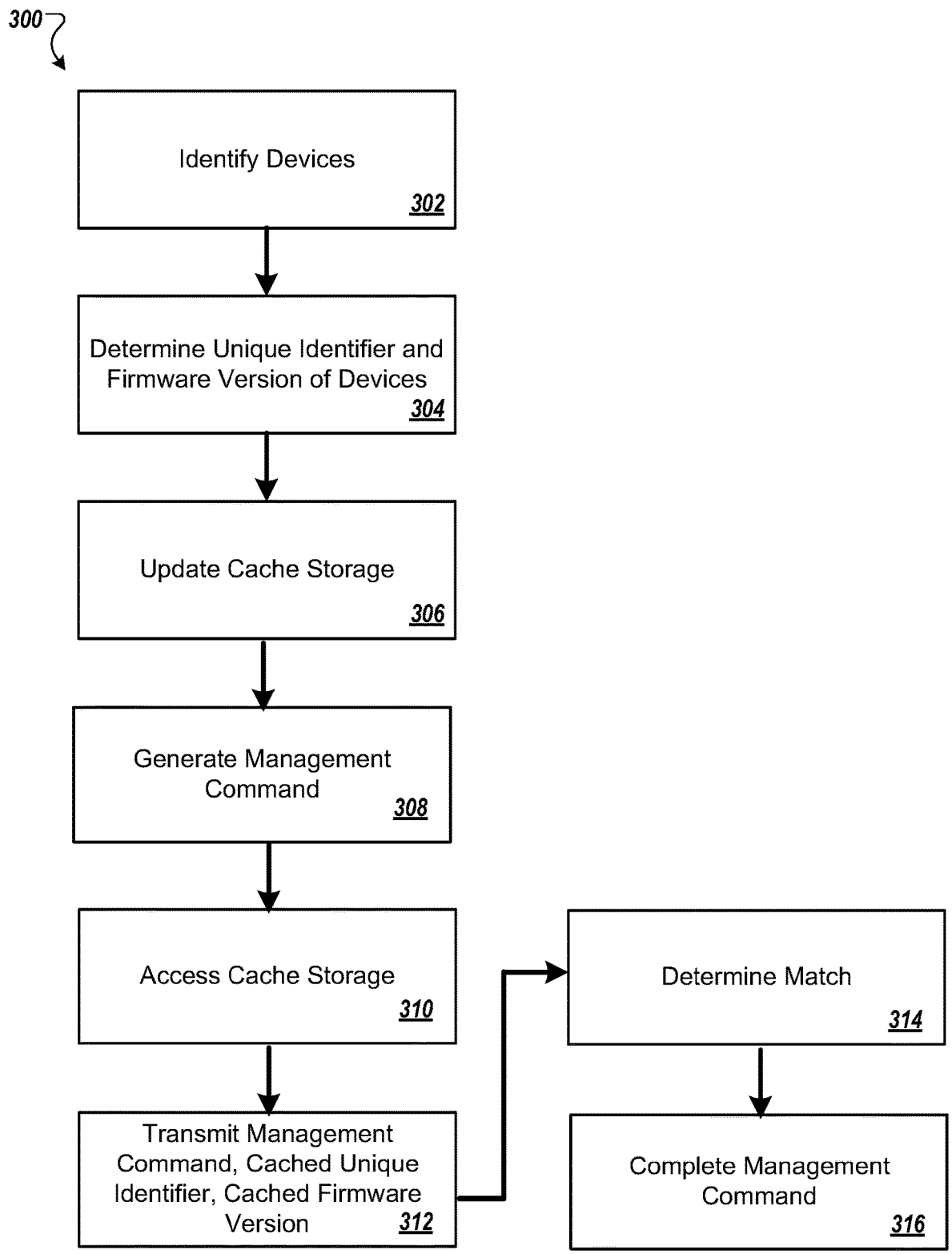
FIG. 3 illustrates a flowchart for controlling management commands at devices.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Turning now to FIG. 2, FIG. 2 illustrates a computing environment 200 for controlling management commands at devices. The computing environment 200 can include a computing device 202 and a cache storage 203. The computing device 202 can be similar to the information handling system 100 of FIG. 1. The computing device 202 can include an operating system (OS) module 204, one or more devices 206, and one or more device drivers 208. Each of the devices 206 can be in communication, or associated with, a respective device driver 208. The OS module 204 can include a management software module 210. The management software module 210 can perform management operations at the devices 206.

In some examples, the devices 206 can be included by the computing device 202, or external to the computing device 202. That is, the computing device 202 can be in communication with the devices 206. In some examples, the cache storage 203 can be included by the computing device 202, or external to the computing device 202. That is, the computing device 202 can be in communication with the cache storage 203.

In some implementations, the management software module 210 is in communication with the devices 206 to identify the devices 206 for inventorying of the devices 206. In some examples, the devices 206 can include any device that is able to be replaced without stopping or shutting down of the computing device 202. In other words, the devices 206 can be "hot pluggable" or "hot swappable." In some examples, the devices can include storage devices such as hard drives.

The management software module 210 can determine, for each of the devices 206, data that uniquely identifies the device 206. In some examples, the management software module 210 can determine, for each of the devices 206, i) a unique identifier for the device 206 and ii) a firmware version of the device 206. Specifically, the unique identifier for each device 206 can be based on one or more properties of the device 206. That is, the unique identifier can be derived from the properties of the respective device 206. In some examples, the management software module 210 can apply an algorithm based on the properties of the device 206 to determine the unique identifier for the device 206. In some examples, the data that uniquely identifies the device 206 can further include a serial number of the device 206, a state of the device 206 (e.g., with respect to the OS module 204), a current configuration of the device 206 (e.g., with respect to the OS module 204), or other context information of the device 206. In some examples, the unique identifier can include a universally unique identifier (UUID). In some examples, the data that uniquely identifies the device 206 can be determined at the device level, the OS level, or both.

The management software module 210 can update the cache storage 203 to store the unique identifier and the firmware version for each device 206, shown as cached unique identifier 220 and cached firmware version 222. In some examples, the cache storage 203 can include data previously collected that identifies the unique identifier and the firmware version for each device 206, and the management software module 210 can update such data to indicate the most-recently obtained unique identifier and firmware version for each device 206. In some examples, the management software module 210 can create new data that is stored by the cache storage 203 that indicates the most-recently obtained unique identifier and firmware version for each device 206.

The management software module 210 can generate, for a particular device 206, a management command 230 that is to be performed at the particular device 206. Specifically, the management software module 210 can build, or generate, a requested command packet for the particular device 206. For example, the particular device 206 can include a storage device, and can be marked for deletion of contents thereof. The management command 230 can include a command to erase the contents of the particular device 206.

The management software module 210 can, in response to the management command 230, access the cache storage 203 to identify the cached unique identifier 220 and the cached firmware version 222 for the particular device 206. The management software module 210 can transmit the management command 230 to the device driver 208 that is associated with the particular device 206. Further, the management software module 210 can transmit, to the device driver 208 associated with the particular device 206, data indicating the cached unique identifier 220 and the cached firmware version 222. In other words, the management software module 210 can package the management command 230 and the data identifying the particular device 206—the cached unique identifier 220 and the cached firmware version 222—for transmission to the appropriate device driver 208. In some examples, the management software module 210 directly communicates with the particular device 206, and provides the packaged management command 230 and data indicating the cached unique identifier 220, cached firmware version 222 directly to the particular device 206. In some examples, after the management software module 220 communicates with the device drive 208 that is associated with the particular device 206, the device driver 208 can transmit the packaged management command 230 and data indicating the cached unique identifier 220, cached firmware version 222 to the particular device 206.

The device driver 208, in response to receiving the management command 230, can determine current data that uniquely identifies the particular device 206. That is, the device driver 208, in response to the management command 230, can determine i) the current unique identifier for the particular device 206 and determine ii) the current firmware version for the particular device 206. Similar to that mentioned above, the device driver 208 can apply an algorithm based on the properties of the particular device 206 to determine the current unique identifier for the particular device 206. Specifically, the device driver 208 can apply the same algorithm to determine the current unique identifier for the particular device 206 as the algorithm that the management software module 210 uses to determine the cached unique identifier 220 for the particular device 206.

The device driver 208 can determine whether the cached data that uniquely identifies the particular device 206 is the same as the current data that uniquely identifies the particular device 206. Specifically, the device driver 208 can determine whether the i) cached unique identifier 220 matches the current unique identifier for the particular device 206 and whether ii) the cached firmware version 222 matches a current firmware version for the particular device 206. In some examples, the device driver 208 determines that the i) cached unique identifier 220 matches the current unique identifier for the particular device 206 and that the ii) cached firmware version 222 matches the current firmware version for the particular device 206. In some examples, the particular device 206 determines whether the i) cached unique identifier 220 matches the current unique identifier for the particular device 206 and whether ii) the cached firmware version 222 matches a current firmware version for the particular device 206. In some examples, the particular device 26 determines that the i) cached unique identifier 220 matches the current unique identifier for the particular device 206 and that the ii) cached firmware version 222 matches the current firmware version for the particular device 206.

In response to determining that the i) cached unique identifier 220 matches the current unique identifier for the particular device 206 and that the ii) cached firmware version 222 matches the current firmware version for the particular device 206, the management command 230 can be completed at the particular device 206. In other words, in response to the matching, the management command 230 is transmitted to the particular device 206 such that the management command 230 can be performed at the particular device 206. In some examples, the device driver 208 is only able to implement a mutex where only one management command can be processed at a time.

In some examples, the device driver 208 determines that the cached unique identifier 220 does not match the current unique identifier for the particular device 206. If such a mis-match occurs (e.g., between the cached unique identifier 220 and the current unique identifier for the particular device 206), the management command 230 is rejected by the device driver 208. In some examples, when the cached unique identifier 220 does not match the current unique identifier for the particular device 206, the particular device 206 may have been previously "hot-swapped." In some examples, the particular device 206 determines that the cached unique identifier 220 does not match the current unique identifier for the particular device 206.

In some examples, the device driver 208 determines that the cached firmware version 222 does not match the current firmware version for the particular device 206. If such a mis-match occurs (e.g., between the cached firmware version 222 and the current firmware version for the particular device 206), the management command 230 is rejected by the device driver 208. In some examples, when the cached firmware version 222 does not match the current firmware version for the particular device 206, the firmware may have been changed for the particular device 206. In some examples, the particular device 206 determines that the cached firmware version 222 does not match the current firmware version for the particular device 206.

In some examples, the particular device 206 can be removed, and re-inserted—that is, the same particular device 206 is re-inserted. To that end, the device driver 208 can determine whether the cached data that uniquely identifies the particular device 206 is the same as the current data that uniquely identifies the particular device 206 including determining whether a current configuration of the particular device 206 is the same as previous configuration data of the particular device 206 (e.g., with respect to the OS module 204). When the particular device 206 is re-inserted, the configuration information of the particular device 206 can be different that the configuration information of the particular device 206 prior to re-insertion (e.g., the particular device 206 is in a new state, the configuration information is "reset"). Thus, the device driver 208 can determine that the particular device 206 has been "hot-swapped" and the management command 230 can be rejected by the device driver 208.

In a use case example, the devices 206 can include non-volatile memory express (NVMe) devices. NVMe devices (or drives) support the ability to cryptographically erase contents thereof. However, before such an operation is allowed, the operation is confirmed due to its destructive nature. When a user is prompted for such a confirmation, the drive may have been swapped for another. Thus, by providing confirmation of information that uniquely identifies the drive, management operations that are to be performed can be re-evaluated to ensure that data is not destroyed (e.g., the incorrect data is not inadvertently destroyed).

FIG. 3 illustrates a flowchart depicting selected elements of an embodiment of a method 300 for controlling management commands at devices. The method 300 may be performed by the computing device 202, the drivers 208, and/or the management software module 210 described herein with reference to FIGS. 1-2, or another information handling system. It is noted that certain operations described in method 300 may be optional or may be rearranged in different embodiments.

The management software module 210 identifies the devices 206 for inventorying of the devices 206 (302). The management software module 210 can determine, for each of the devices, i) a unique identifier for the device 206 and ii) a firmware version of the device 206 (304). The management software module 210 can update the cache storage 203 to store the unique identifier and the firmware version for each device 206 (306). For example, the cached unique identifier 220 and the cached firmware version 222. The management software module 210 can generate, for a particular device 206, a management command 230 that is to be performed at the particular device 206 (308). The management software module 210 can, in response to the management command 230, access the cache storage 203 to identify the cached unique identifier 220 and the cached firmware version 222 for the particular device 206 (310). The management software module 210 can transmit to the device driver 208 associated with the particular device 206 (or to the particular device 206), the management command 230 and data indicating the cached unique identifier 220 and the cached firmware version 222 (312). The device driver 208 (or the particular device 206), in response to the management command 230, determines that the i) cached unique identifier 220 matches the current unique identifier for the particular device 206 and that the ii) cached firmware version 222 matches a current firmware version for the particular device 206 (314). In response to the matching, the management command 230 can be completed at the particular device 206 (316).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method for controlling management commands at devices, the method comprising:
   identifying a plurality of devices for inventorying;
   determining, for each of the plurality of devices and by a management software module, i) a unique identifier for the device and ii) a firmware version of the device;
   updating a cache storage to store the unique identifier and the firmware version for each device of the plurality of devices;
   generating, for a particular device of the plurality of devices and by the management software module, a management command that is to be performed at the particular device;
   in response to generating the management command, accessing the cache storage to identify the cached unique identifier and the cached firmware version for the particular device;
   transmitting, by the management software module and to a device driver associated with the particular device or to the particular device, the management command and data indicating the cached unique identifier and the cached firmware version for the particular device;

determining, by the device driver or the particular device, that i) the cached unique identifier matches a current unique identifier for the particular device and ii) the cached firmware version matches a current firmware version for the particular device; and in response to the matching, completing the management command at the particular device.

2. The computer-implemented method of claim 1, further comprising:

determining, by the device driver or the particular device, that the cached unique identifier does not match the current unique identifier for the particular device; and in response to determining that the cached unique identifier does not match the current unique identifier for the particular device, rejecting the management command at the particular device.

3. The computer-implemented method of claim 1, further comprising:

determining, by the device driver or the particular device, that the cached firmware version does not match the current firmware version for the particular device; and in response to determining that the cached firmware version does not match the current firmware version for the particular device, rejecting the management command at the particular device.

4. The computer-implemented method of claim 1, wherein the unique identifier for each device is based on one or more properties of the device, the properties including, for each device, one or more of a serial number of the device, a state of the device, and a current configuration of the device.

5. The computer-implemented method of claim 4, further comprising applying, by the management software module, an algorithm based on the properties of the particular device to determine the unique identifier for the particular device.

6. The computer-implemented method of claim 4, further comprising:

determining, by the device driver, i) the current unique identifier for the particular device and ii) the current firmware version for the particular device.

7. The computer-implemented method of claim 6, further comprising applying, by the device driver, an algorithm based on the properties of the particular device to determine the current unique identifier for the particular device.

8. The computer-implemented method of claim 1, wherein the unique identifier is a universally unique identifier (UUID).

9. The computer-implemented method of claim 1, wherein the plurality of devices are storage devices.

10. A system comprising a processor having access to memory media storing instructions executable by the processor to perform operations comprising:

identifying a plurality of devices for inventorying;

determining, for each of the plurality of devices and by a management software module, i) a unique identifier for the device and ii) a firmware version of the device;

updating a cache storage to store the unique identifier and the firmware version for each device of the plurality of devices;

generating, for a particular device of the plurality of devices and by the management software module, a management command that is to be performed at the particular device;

in response to generating the management command, accessing the cache storage to identify the cached unique identifier and the cached firmware version for the particular device;

transmitting, by the management software module and to a device driver associated with the particular device or to the particular device, the management command and data indicating the cached unique identifier and the cached firmware version for the particular device;

determining, by the device driver or the particular device, that i) the cached unique identifier matches a current unique identifier for the particular device and ii) the cached firmware version matches a current firmware version for the particular device; and in response to the matching, completing the management command at the particular device.

11. The system of claim 10, the operations further comprising:

determining, by the device driver or the particular device, that the cached unique identifier does not match the current unique identifier for the particular device; and in response to determining that the cached unique identifier does not match the current unique identifier for the particular device, rejecting the management command at the particular device.

12. The system of claim 10, the operations further comprising:

determining, by the device driver or the particular device, that the cached firmware version does not match the current firmware version for the particular device; and in response to determining that the cached firmware version does not match the current firmware version for the particular device, rejecting the management command at the particular device.

13. The system of claim 10, wherein the unique identifier for each device is based on one or more properties of the device, the properties including, for each device, one or more of a serial number of the device, a state of the device, and a current configuration of the device.

14. The system of claim 13, the operations further comprising applying, by the management software module, an algorithm based on the properties of the particular device to determine the unique identifier for the particular device.

15. The system of claim 10, the operations further comprising:

determining, by the device driver, i) the current unique identifier for the particular device and ii) the current firmware version for the particular device.

16. The system of claim 15, the operations further comprising applying, by the device driver, an algorithm based on the properties of the particular device to determine the current unique identifier for the particular device.

17. The system of claim 10, wherein the unique identifier is a universally unique identifier (UUID).

18. The system of claim 10, wherein the plurality of devices are storage devices.

19. A non-transitory computer-readable medium storing software comprising instructions executable by one or more computers which, upon such execution, cause the one or more computers to perform operations comprising:

identifying a plurality of devices for inventorying;

determining, for each of the plurality of devices and by a management software module, i) a unique identifier for the device and ii) a firmware version of the device;

updating a cache storage to store the unique identifier and the firmware version for each device of the plurality of devices;

generating, for a particular device of the plurality of devices and by the management software module, a management command that is to be performed at the particular device;

in response to generating the management command, accessing the cache storage to identify the cached unique identifier and the cached firmware version for the particular device;

transmitting, by the management software module and to a device driver associated with the particular device, or to the particular device the management command and data indicating the cached unique identifier and the cached firmware version for the particular device;

determining, by the device driver or the particular device, that i) the cached unique identifier matches a current unique identifier for the particular device and ii) the cached firmware version matches a current firmware version for the particular device; and in response to the matching, completing the management command at the particular device.

20. The computer-readable medium of claim 19, the operations further comprising:

determining, by the device driver or the particular device, that the cached unique identifier does not match the current unique identifier for the particular device; and in response to determining that the cached unique identifier does not match the current unique identifier for the particular device, rejecting the management command at the particular device.

* * * * *